(12) United States Patent
Hassett et al.

(10) Patent No.: US 7,464,988 B2
(45) Date of Patent: Dec. 16, 2008

(54) DEVICE FOR SECURING ITEMS BETWEEN TWO ADJACENT SEATS

(75) Inventors: Eric S. Hassett, Golden, CO (US); James Allen Bergh, Boulder, CO (US)

(73) Assignee: Thule Organization Solutions, Inc., Longmont, CO (US)

( * ) Notice: Subject to any disclaimer, the term of this patent is extended or adjusted under 35 U.S.C. 154(b) by 0 days.

(21) Appl. No.: 11/743,596

(22) Filed: May 2, 2007

(65) Prior Publication Data

US 2007/0228782 A1  Oct. 4, 2007

Related U.S. Application Data

(63) Continuation of application No. 11/690,751, filed on Mar. 23, 2007, which is a continuation-in-part of application No. 11/097,822, filed on Apr. 1, 2005, now Pat. No. 7,207,626, which is a continuation-in-part of application No. 29/214,147, filed on Sep. 27, 2004, now Pat. No. Des. 539,037.

(60) Provisional application No. 60/559,191, filed on Apr. 1, 2004.

(51) Int. Cl.
*A47C 7/62* (2006.01)

(52) U.S. Cl. ............... 297/188.06; 297/188.2

(58) Field of Classification Search ............ 297/188.06, 297/401, 188.2, 188.05, 188.04, 188.01, 297/188.18, 188.02, 188.07, 188.21, 188.03; 224/275; D12/421, 416
See application file for complete search history.

(56) References Cited

U.S. PATENT DOCUMENTS 2,566,757 A * 9/1951 Alexander ................. 297/401
2,640,595 A   6/1953 Byford
2,706,516 A * 4/1955 Nordmark .............. 297/188.06
4,130,316 A   12/1978 Rossi
4,585,196 A * 4/1986 Cormier .................... 248/214
4,801,060 A   1/1989 Thompson
D312,727 S   12/1990 Kunewalder
D313,695 S   1/1991 Mawhinney et al.
D318,641 S   7/1991 Schwartz
D318,949 S   8/1991 Mawhinney et al.
5,044,321 A   9/1991 Selph
5,044,577 A   9/1991 Spearman
D324,953 S   3/1992 Swanner
D329,836 S   9/1992 Meyers
5,421,638 A   6/1995 Ayotte et al.
5,489,055 A   2/1996 Levy
D379,452 S   5/1997 Russell et al.
D389,115 S   1/1998 Alves et al.

(Continued)

OTHER PUBLICATIONS

Case Logic Spring 2000 Catalog, p. 16.

(Continued)

*Primary Examiner*—Milton Nelson, Jr.
(74) *Attorney, Agent, or Firm*—Sheridan Ross P.C.

(57) ABSTRACT

A storage device is provided that secures a plurality of items commonly used by individuals in automobiles. More specifically, in one embodiment the device secures a plurality of items by engaging adjacent seats of an automobile, thus allowing for easy access to the items stored therein, and which includes a deflectable loop material for securing the storage device between the vehicle seats.

6 Claims, 12 Drawing Sheets

U.S. PATENT DOCUMENTS

| | | | |
|---|---|---|---|
| 5,720,458 A | 2/1998 | Carpenter | |
| 5,725,189 A * | 3/1998 | Landy | 248/205.2 |
| 5,746,363 A | 5/1998 | Tella et al. | |
| D396,383 S | 7/1998 | Hanson | |
| 5,800,019 A * | 9/1998 | Knightlinger | 297/399 |
| 5,868,294 A | 2/1999 | Webster | |
| D413,299 S | 8/1999 | Hartmann et al. | |
| 6,082,816 A | 7/2000 | Gottlieb et al. | |
| 6,092,705 A | 7/2000 | Meritt | |
| 6,097,448 A | 8/2000 | Perkins | |
| D430,534 S | 9/2000 | Golenz | |
| D432,075 S | 10/2000 | Hassett et al. | |
| D441,341 S | 5/2001 | Hassett et al. | |
| 6,227,510 B1 | 5/2001 | McMullen, Sr. | |
| D451,882 S | 12/2001 | Hassett et al. | |
| 6,361,009 B1 | 3/2002 | Li | |
| D494,534 S | 8/2004 | Hassett | |
| 7,207,626 B2 | 4/2007 | Hassett | |
| 2004/0112931 A1 | 6/2004 | Swaim et al. | |

OTHER PUBLICATIONS

Case Logic 2002 Catalog, p. 33.
Axius Organizers Catalog 1998, "Auto Pockets".

\* cited by examiner

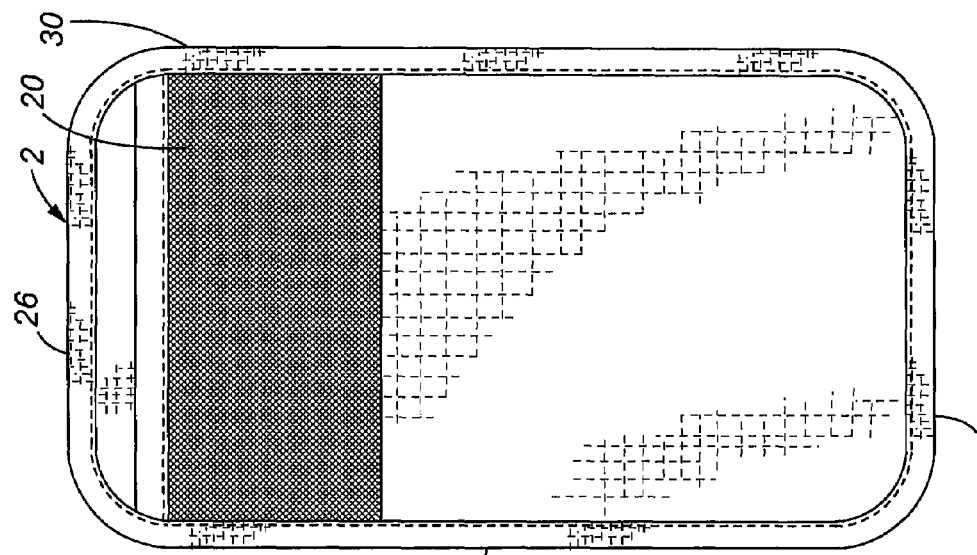
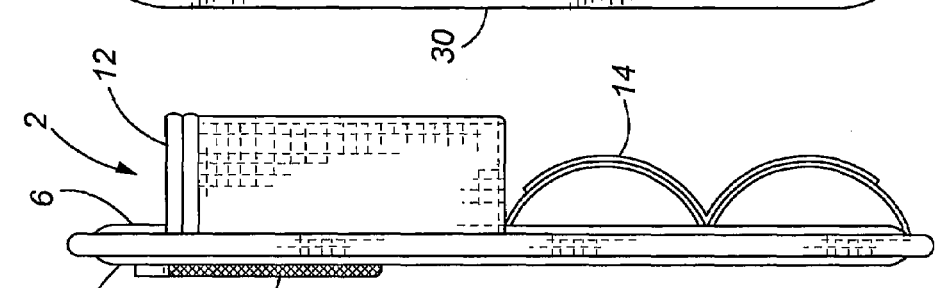
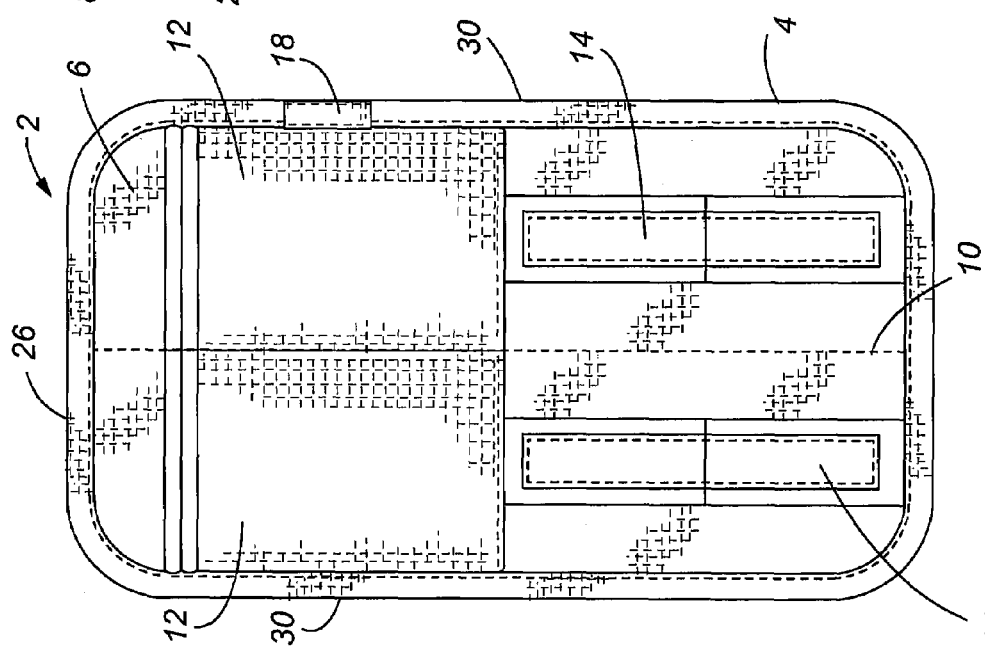

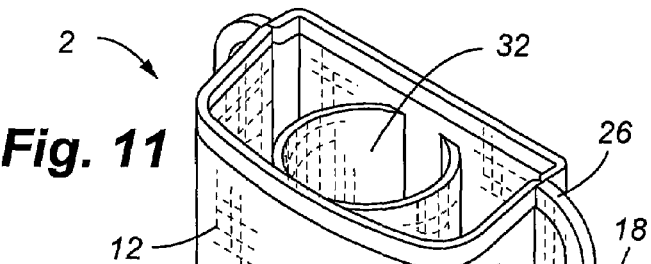
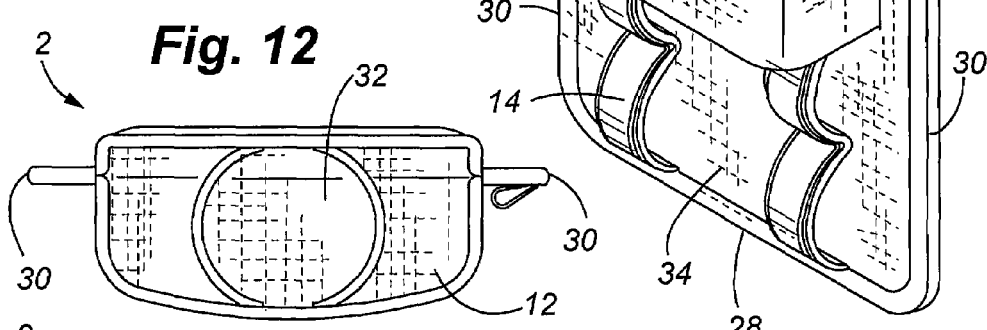
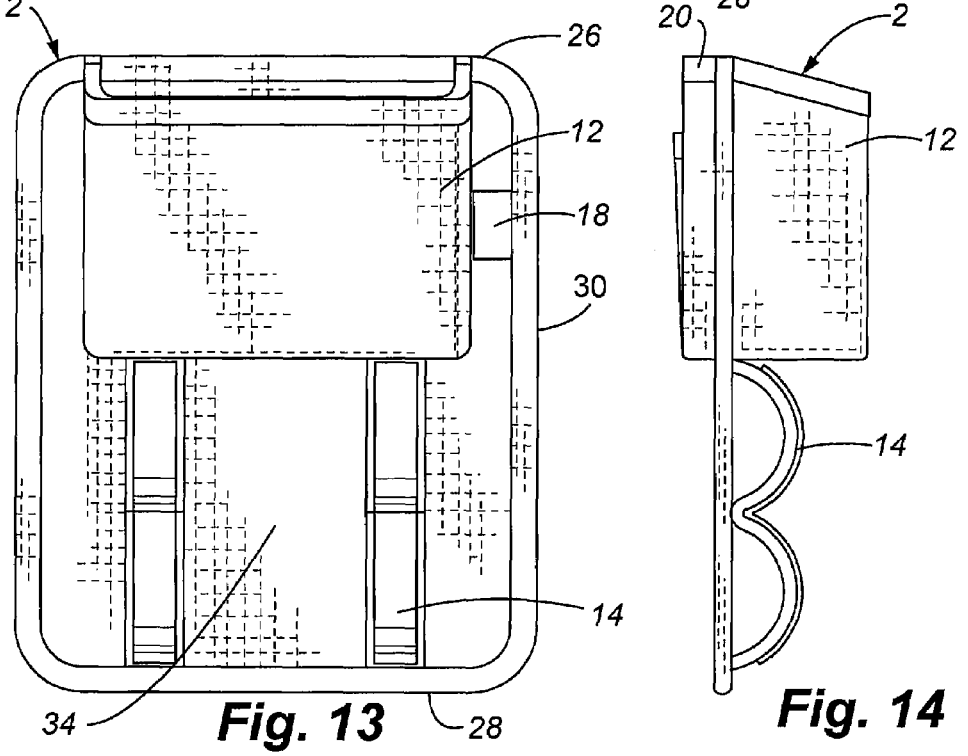

Fig. 20
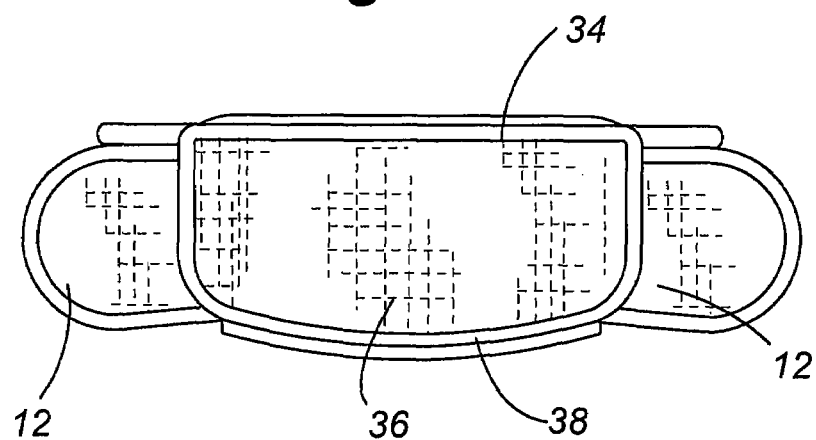
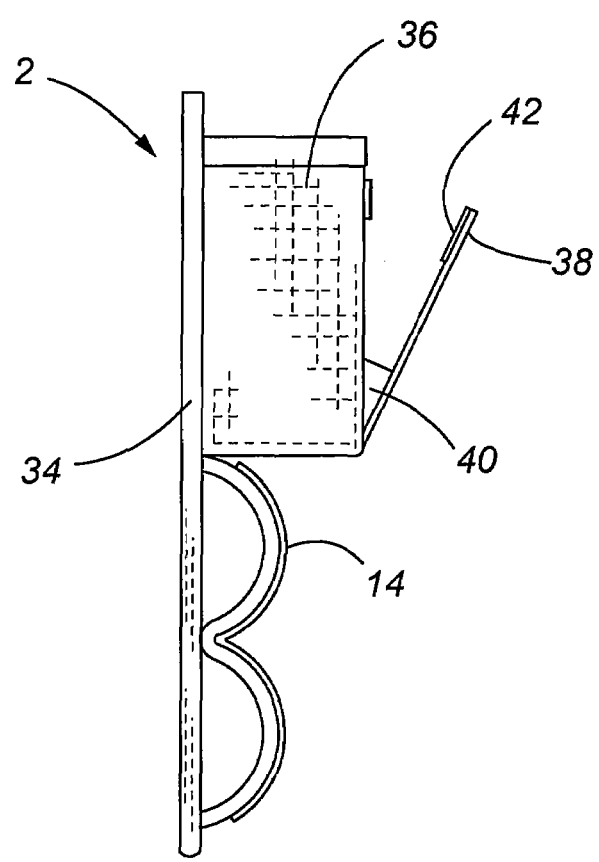
Fig. 21

DEVICE FOR SECURING ITEMS BETWEEN TWO ADJACENT SEATS

This application is a Continuation of U.S. patent application Ser. No. 11/690,751, filed Mar. 23, 2007, which is a Continuation-in-Part of U.S. patent application Ser. No. 11/097,822, filed Apr. 1, 2005, now U.S. Pat. No. 7,207,626, which claims the benefit of U.S. Provisional Patent Application Ser. No. 60/559,191, filed Apr. 1, 2004, and which is a Continuation-in-Part of U.S. Design Pat. Application Ser. No. 29/214,147, filed Sep. 27, 2004, now U.S. Pat. No. D539,037, all of which are incorporated by reference in their entirety herein.

FIELD OF THE INVENTION

Embodiments of the present invention are generally related to devices that secure and provide easy access to a plurality of items commonly used during the operation of a motor vehicle. More specifically, one embodiment of the present invention is adapted for positioning between two adjacent automobile seats and provides a plurality of storage locations for items commonly used by automobile operators such as sunglasses and cellular phones.

BACKGROUND OF THE INVENTION

Individuals spend an increasing amount of time in their automobiles, often on long commutes or in traffic delays, for example. In addition, some individuals choose to perform day-to-day tasks while in automobiles, such as communicating on cellular phones, writing oil note pads, etc. Many automobiles sold today include various storage compartments that are generally located in a center console, a floor console, or in an overhead storage location. However, accessing stored items such as cell phones, CDs, tapes, letters, pens, pencils, maps, electrical devices, etc. from compartments of the prior art is often difficult and/or distracting to the driver, thereby making such an attempt a source of danger to other drivers and themselves. Center consoles are usually situated between two adjacent automobile seats and require opening of a panel to gain access to the stored items. In addition, center consoles are often excessively deep, such that smaller items are difficult to find, thereby forcing the driver to take his attention off the road to search for the required items. Further, glove compartments, a popular storage area, in all automobiles are located on the opposite side of the driver so accessing contents therein while driving is very difficult.

Thus, there is a long felt need in the field of automobile accessory storage to provide an efficient storage device that enhances the accessibility of small items, and which also allows the driver to maintain his or her attention on the road while driving. The following disclosure describes a storage device for small items that are adapted to be situated between two adjacent seats of an automobile.

SUMMARY OF THE INVENTION

It is one aspect of the present invention to provide a device that may be used in at least two distinct positions to secure items between two adjacent seats of an automobile. More specifically, one embodiment of the present invention includes a resiliently deflectable panel that provides support for the interconnection of a plurality of pockets and securement mechanisms. The resiliently deflectable panel also includes an axis thereon that allows deflection of the panel wherein it may be folded upon itself for selective engagement between two adjacent seats of an automobile. The securing mechanisms, after folding, have a combined thickness that is adapted to reside within the gap found between the seats of many automobiles and resiliently deflect the adjacent seats. Alternatively, the present invention may be used in an unfolded orientation if the gap between the seats is sufficiently small. Thus the present invention provides more robust storage options to the consumer, and is adapted for use in a number of automobiles that have different dimensions between the seats.

Alternatively, it is a related aspect of the present invention to provide a device that is used in only one distinct position to secure items between two adjacent seats in an automobile. More specifically, one embodiment of the present invention includes a rigid or semi-rigid panel that provides support for the interconnection of at least one of a plurality of pockets, a storage compartment, a cup holder and a securement mechanism. The panel may be comprised of cardboard, plastic, fiberglass or other well known materials, that are covered with nylon on other similar materials. The securement mechanisms of this embodiment are similar to those described above, however, they are such that the device does not require alteration or folding to fit snugly between two seats. In addition, one embodiment includes a pocket wherein a selectively alterable cup holder is located. Further, some embodiments include storage compartments with a selectively openable panel for the storage and securement of small items and which may also include a zipper, hook and loop material or other fastening mechanisms for selective closure.

It is another aspect of the present invention to provide a device for securing items that is constructed from common materials, and thus inexpensive to manufacture. One embodiment of the present invention employs a substantially rigid core with an area integrated therein that allows for selective deflection. In addition, the core is surrounded by a compliant material, such as nylon. Compliant materials are also used to construct the pockets and portions of the securing mechanisms, thus providing a device that is easily cleaned and tolerant to many environmental conditions, such as extreme heat and cold. In one embodiment of the present invention, the securing mechanisms are constructed of resiliently deflectable plastic, elastic or rubber to provide a snug fit between two adjacent seats.

It is still yet another aspect of the present invention to provide a device with a plurality of storage locations. More specifically, one embodiment of the present invention is adapted to receive and secure items commonly used or found in an automobile, such as cell phones, make-up, cigarettes, lighters, soft drinks, sunglasses, garage door openers, maps, flashlights, etc. The present invention is also adapted to secure items in an easily accessible location, such as between two adjacent seats, wherein the smaller objects may be accessed quickly and easily without having to explore the often larger storage compartments provided by automobile manufacturers. This convenient storage location increases safety by alleviating the need for the driver to take his or her attention off the road.

It is another aspect of the present invention to provide a device that can be stored in a folded configuration. More specifically, one embodiment of the present invention includes a selectively rotatable panel wherein during normal operations the panel is oriented as described above for engagement between two vehicle seats. In another position of use the panel is rotated adjacent to the storage pocket, thereby decreasing the size of the device to reduce packaging materials. The decrease in packaging materials will necessarily reduce packaging cost, and in some instances, shipping costs.

Further, a device is provided that also is more environmentally friendly because less packaging materials are required. Embodiments of the present invention that employ the rotatable panel also employ a fastener or other mechanism to maintain the orientation of the panel in the first, operational position of use.

Thus, it is one aspect of the present invention to provide a device securing a plurality of items that is adapted to selectively engage two adjacent seats, comprising:

a pocket adapted to receive and store a plurality of items;

a panel with an upper edge, a lower edge and lateral edges extending therebetween, said upper edge being interconnected to said pocket and having a first position of use wherein said panel extends from said pocket and a second position of use wherein said panel is folded adjacent to said pocket; and a first securing mechanism having a first end separated from a second end each of said first end and said second end interconnected to said panel and adapted for operable engagement between the two adjacent seats wherein a compressive force is exerted on each of the two adjacent seats to impede removal of said storage device.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 4 is a front elevation view of the embodiment of the present invention shown in FIG. 1;

FIG. 5 is a left elevation view of the embodiment of the present invention shown in FIG. 1;

FIG. 6 is a rear elevation view of the embodiment of the present invention shown in FIG. 1;

FIG. 11 is a front perspective view of another embodiment of the present invention that includes a selectively adjustable cup holder;

FIG. 12 is a top plan view of the embodiment of the present invention shown in FIG. 11;

FIG. 13 is a front elevation view of the embodiment of the present inventions shown in FIG. 11;

FIG. 14 is a left elevation view of the embodiment of the present invention shown in FIG. 11;

FIG. 20 is a top plan view of the embodiment of the present invention shown in FIG. 18;

FIG. 21 is a left elevation view of the embodiment of the present invention shown in FIG. 18, and depicting the storage compartment in an open position;

Figure 1:
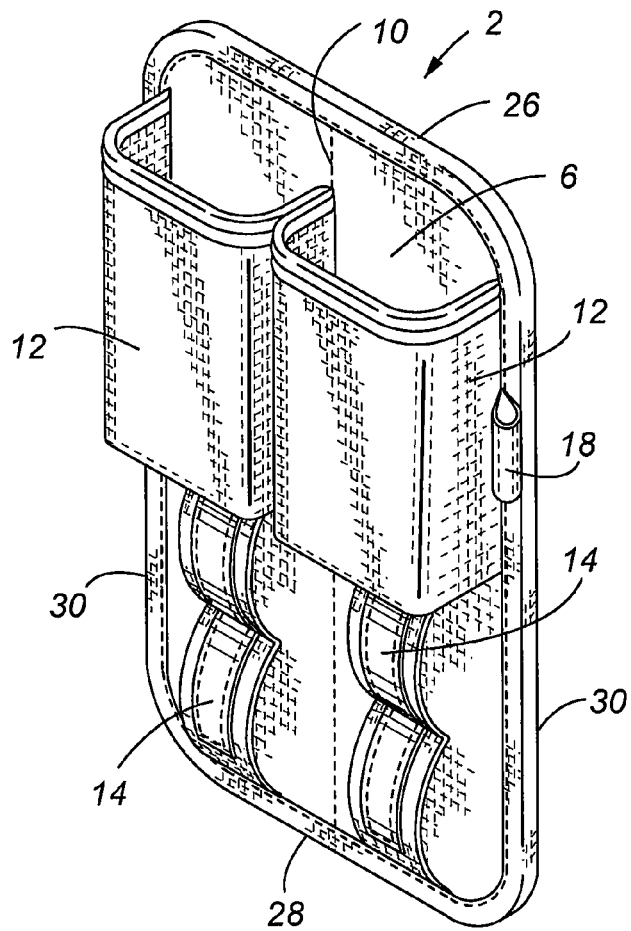
FIG. 1 is a front perspective view of one embodiment of the present invention.
Figure 2:
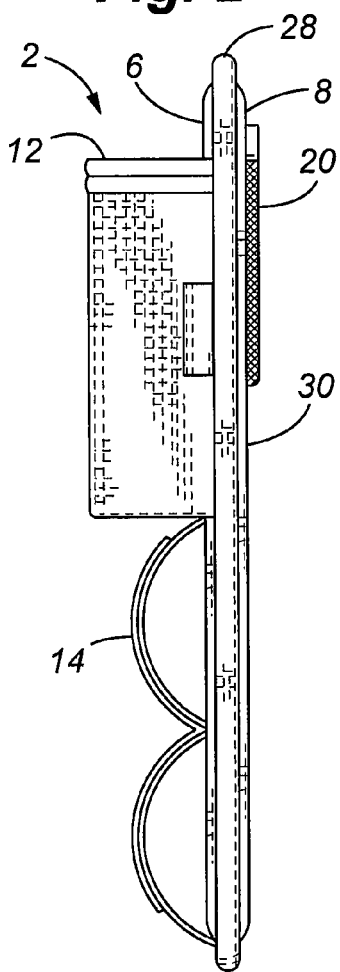
FIG. 2 is a right elevation view of the embodiment of the present invention shown in FIG. 1.
Figure 3:
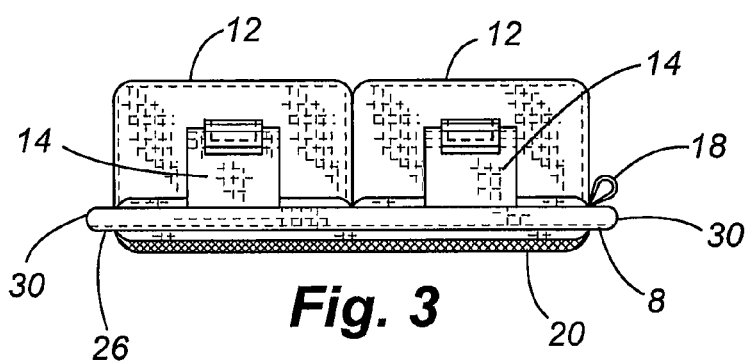
FIG. 3 is a bottom plan view of the embodiment of the present invention shown in FIG. 1.
Figure 7:
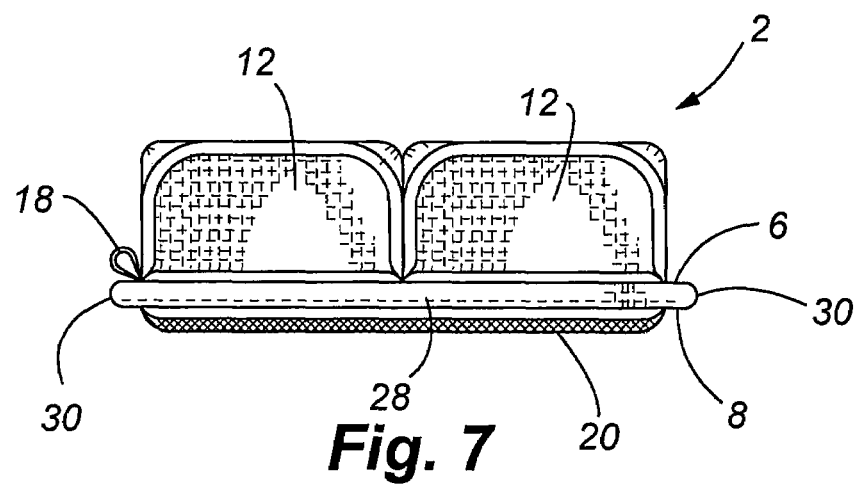
FIG. 7 is a top plan view of the embodiment of the present invention shown in FIG. 1.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Component | # |
|---|---|
| Securing device | 2 |
| Resiliently deflectable panel | 4 |
| Front surface | 6 |
| Rear surface | 8 |
| Axis | 10 |
| Pocket | 12 |
| Securing mechanism | 14 |
| Attachment Point | 15 |
| Car seat | 16 |
| Writing instrument holder | 18 |
| Rear pocket | 20 |
| Sunglasses | 22 |
| Cellular phone | 24 |
| Top Edge | 26 |
| Bottom Edge | 28 |
| Lateral Edge | 30 |
| Perimeter Edge | 31 |
| Cup Holder | 32 |
| Rigid Panel | 34 |
| Storage Compartment | 36 |
| Opening Panel | 38 |
| Gusset | 40 |
| Fastener | 42 |
| Divider | 44 |
| Sleeve | 46 |
| Retention pin | 48 |
| Pin aperture | 50 |
| Hinge | 52 |
| Grip | 54 |

DETAILED DESCRIPTION

Referring now to FIGS. 1-23, a device 2 for securing items between two adjacent seats is shown. More specifically, one embodiment of the present invention employs a resiliently deflectable panel 4 that further includes a front surface 6 and a rear surface 8, a top edge 26, a bottom edge 28, and lateral edges 30 positioned therebetween. The panel 4 of this embodiment of the present invention is capable of selective deflection about an axis 10 thereon, which in one embodiment is positioned substantially between the lateral edges 30. At least one pocket 12 is interconnected to the front surface and rear surfaces 8 of the panel 4. In addition, two securing mechanisms 14 are interconnected to the front surface 6 of the resiliently deflectable panel 4, wherein when the panel 4 is positioned in a folded position of use, the securing mechanisms are oriented on either side of the device. The securing mechanisms 14 are then adapted to selectively engage the gap commonly found between two adjacent car seats 16, for example.

Referring now to FIGS. 1-7, one embodiment of a device for securing items between two adjacent seats 2 is shown. As briefly mentioned above, one embodiment of the present invention includes a resilient deflectable panel 4 that is defined by an upper edge 26, a lower edge 28 and lateral edges 30 positioned therebetween, and an axis 10 that allows for folding the deflectable panel substantially in half. The upper edge 26, lower edge 28 and lateral edges 30 thus define a perimeter edge 31 of the panel 4. The front surface 6 in one embodiment of the present invention provides a location for interconnection of a plurality of pockets 12 that are adapted to receive and secure a plurality of objects, such as sunglasses, cigarettes, lighters, garage door openers, cellular phones, MP3 players, etc. In addition, the two securing mechanisms 14 are interconnected to the front surface 6. The rear surface 8 folds upon itself about the axis 10, wherein the securing mechanisms 24 are then predisposed on opposite sides of the device 2, thereby providing a lateral thickness that is adapted to selectively engage between two adjacent seats of an automobile. Preferably, in one embodiment of the present invention, the securing mechanisms 14 are arcuate shaped members that resiliently deflect to accommodate the gap between two adjacent automobile seats. As shown herein, the securing mechanisms 14 behave similar to leaf springs, and deflect sufficiently to create a biasing force between the seats thereby restricting movement. In one embodiment, the securing mechanisms 14 include at least one attachment point 15 that interconnects the securing mechanism 14 to the panel 4 such that no portion of the securing mechanism extends beyond the perimeter edge 31 of the panel 4. However, other securing mechanisms 14, such as Styrofoam or foam rubber blocks, or other resiliently deflectable materials, may be employed without departing from the scope of the invention. Further, non-deflectable securing mechanisms 14 may be used that do not substantially deflect, but rather are rigid that deflect the seat material to provide securement. In addition, depending on the space between the two adjacent seats, the present invention may be used in the undeflected first position. Further, other pockets may be integrated onto the rear surface 8 of the device 2. When used in the undetected orientation, these rear pockets 20 may be used for thin items such as a letter, for example. Finally, other features may be included on the present invention such as a writing instrument holder 18.

Figure 8:
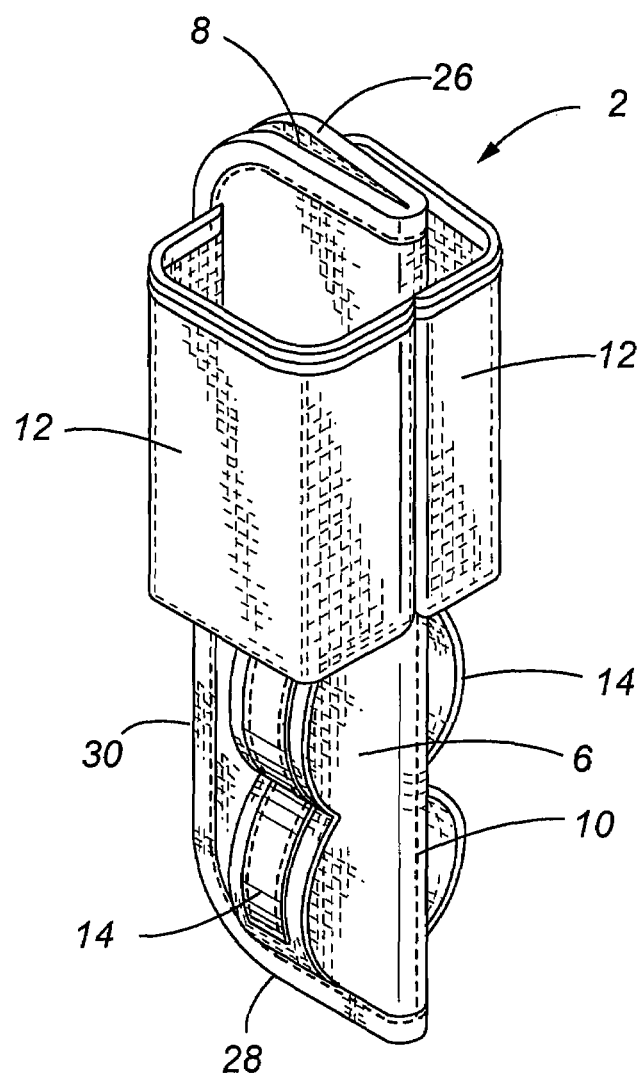
FIG. 8 is a front perspective view of the present invention shown in a second, folded position of use, wherein securing mechanisms are positioned to selectively engage two adjacent car seats.
Figure 9:
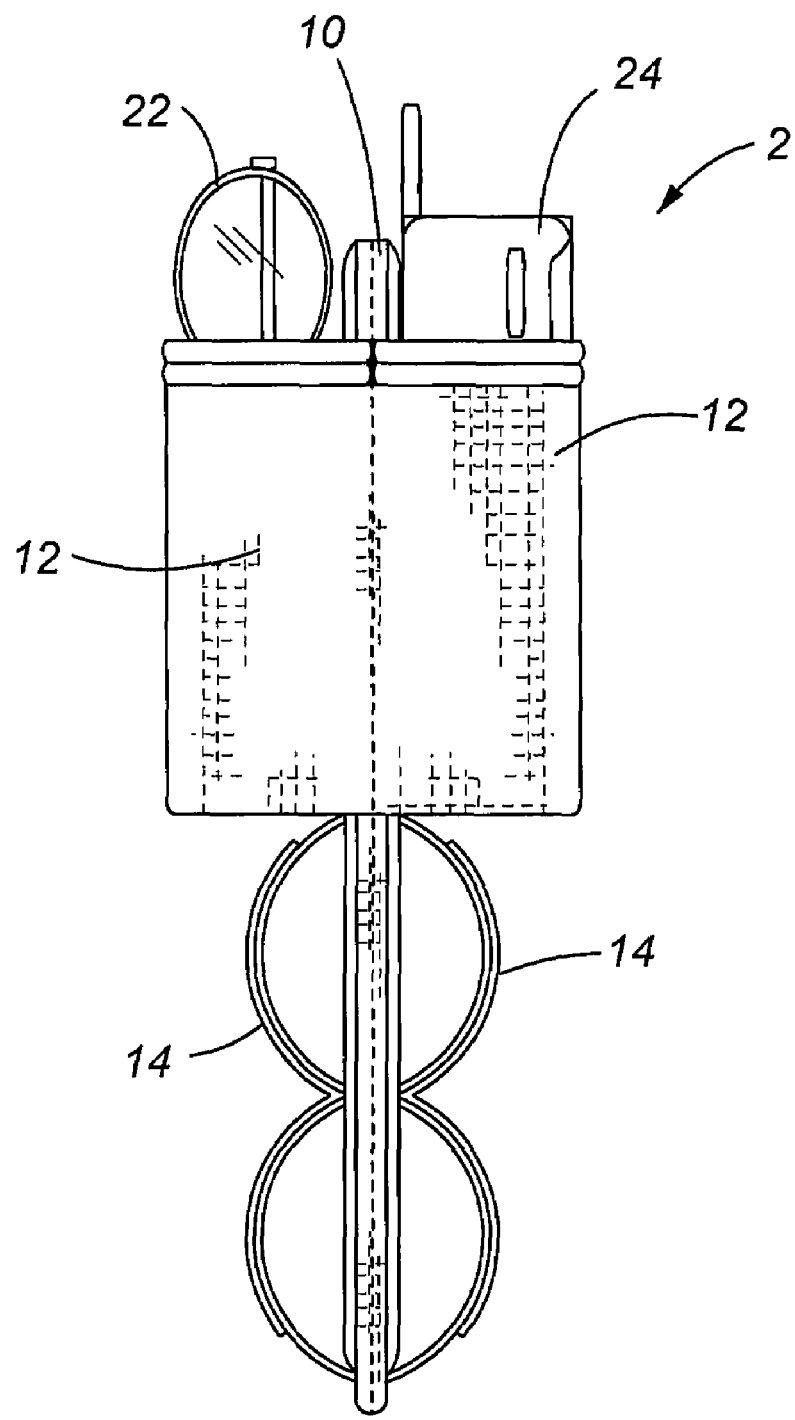
FIG. 9 is a front view of the embodiment of the present invention shown in FIG. 8 in its second position of use, wherein accessories such as sunglasses and cell phones are shown stored therein.
Figure 10:
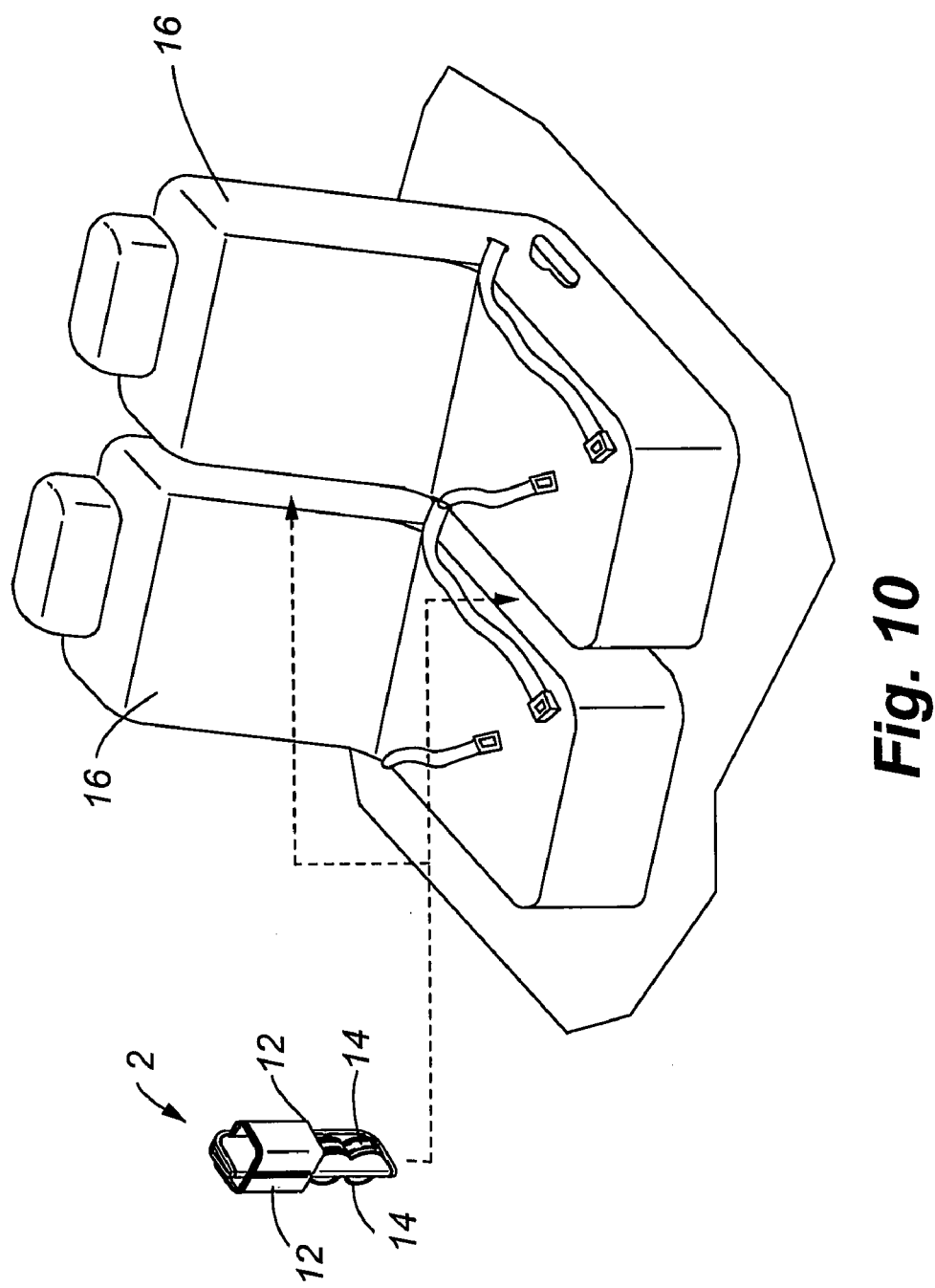
FIG. 10 is a perspective view showing securing options of the present invention between the two adjacent car seats.
Figure 15:
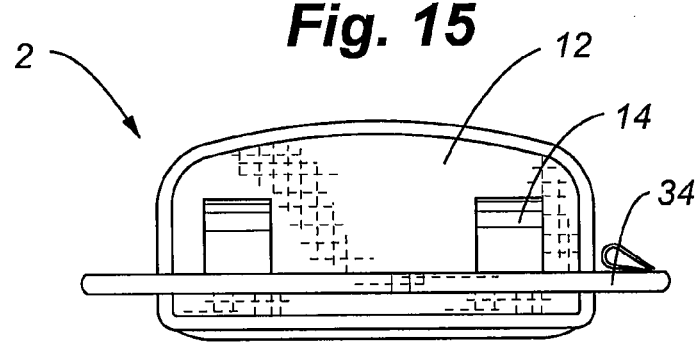
FIG. 15 is a bottom plan view of the embodiment of the present invention shown in FIG. 11.
Figure 16:
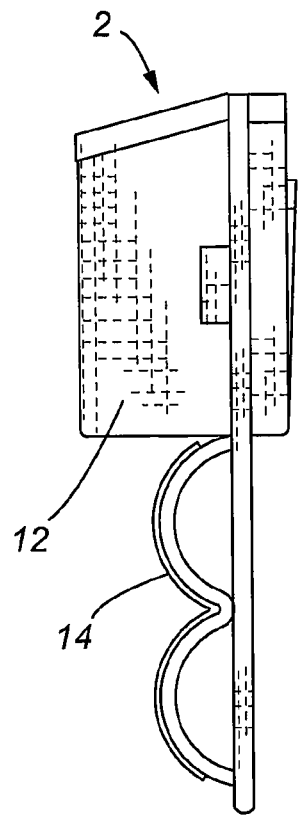
FIG. 16 is a right elevation view of the embodiment of the present invention shown in FIG. 11.
Figure 17:
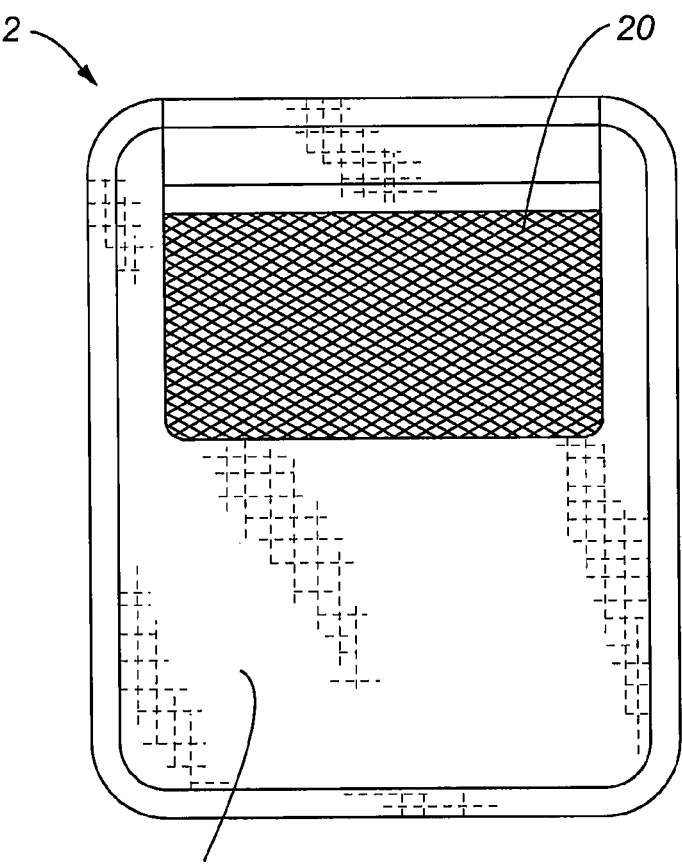
FIG. 17 is a rear elevation view of the embodiment of the present invention shown in FIG. 11.
Figure 18:
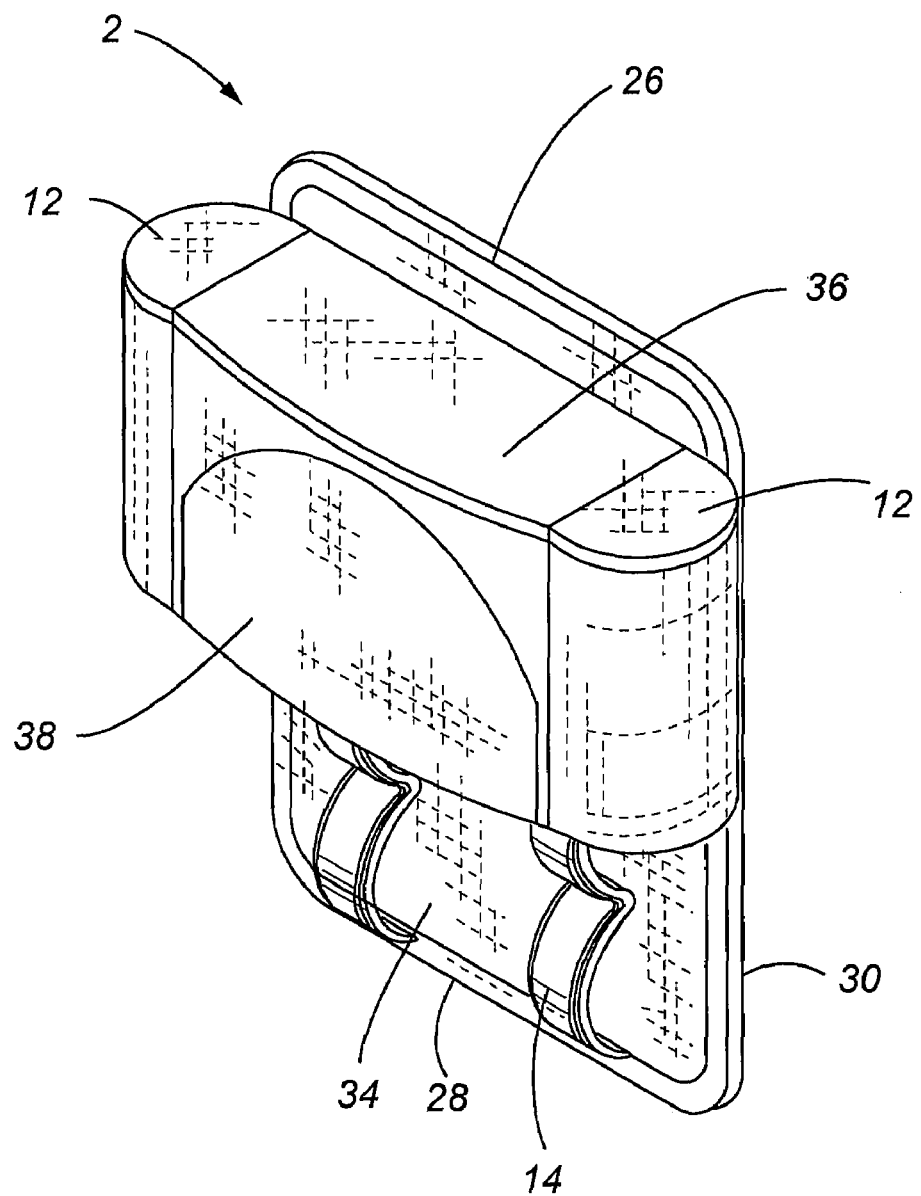
FIG. 18 is a front perspective view of another embodiment of the present invention that includes a selectively accessible storage compartment.
Figure 19:
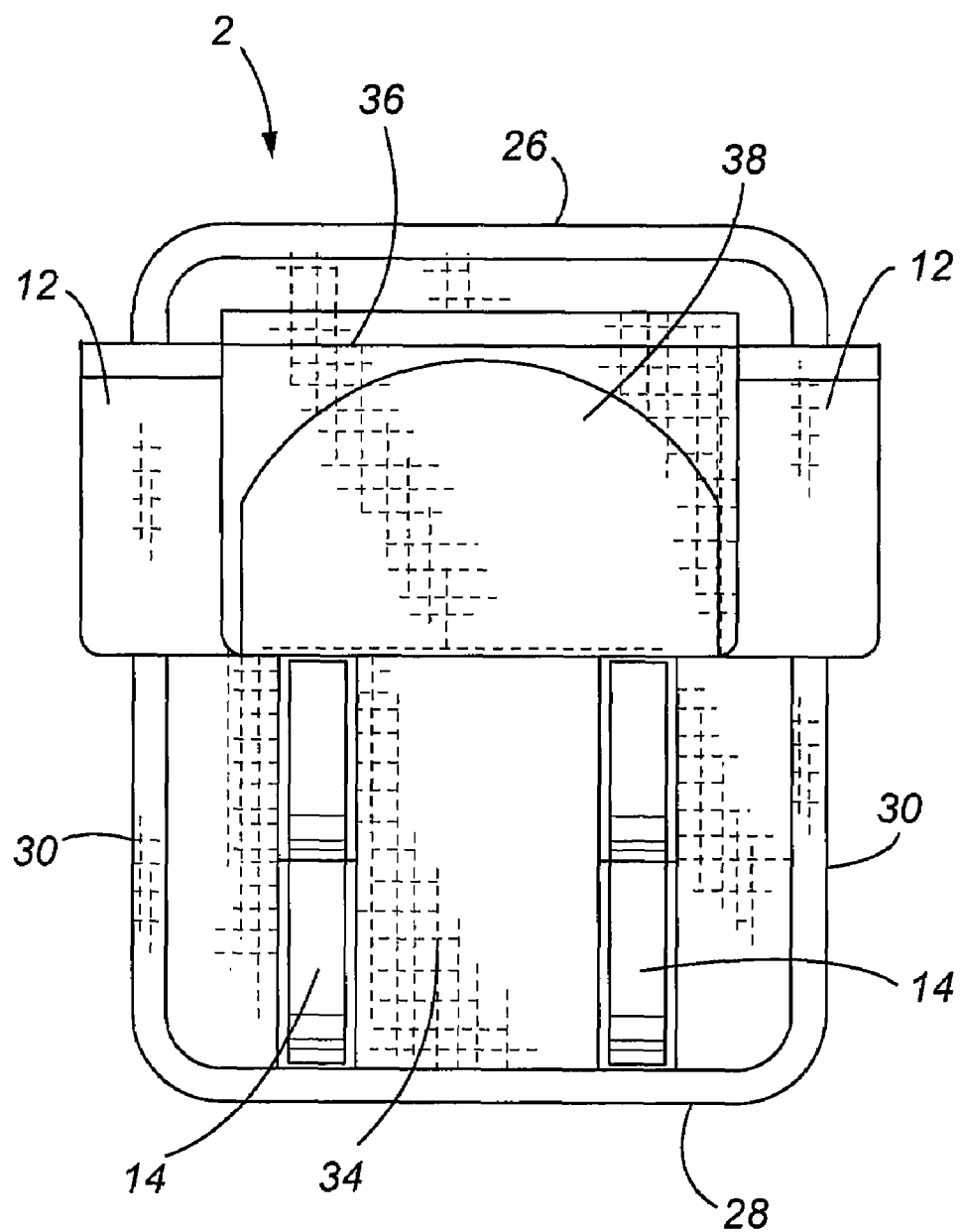
FIG. 19 is a front elevation view of the embodiment of the present inventions shown in FIG. 18.

Referring now to FIGS. 8-10, a device for securing items between two adjacent seats 2 is shown in the second position of use. More specifically, the resiliently deflectable panel 4 is capable of deflecting about the axis 10 employed thereon, thus creating a device 2 of sufficient width to engage and secure between two adjacent seats of an automobile 16. In one embodiment of the present invention, the securing mechanisms 14 are adapted to selectively deform between the soft seat 16 material, and thus allow the device 2 to wedge therebetween. By deflecting the securing mechanisms 14 during the insertion process, sufficient frictional force is created between the compliant surfaces of the seats 16 and the device 2 to provide structural support.

Referring now to FIGS. 11-17, a device for securing items between two adjacent seats 2 is shown that includes a selectively adjustable cup holder 32. More specifically, this embodiment is similar to that shown above, however, the panel that supports the securing mechanisms 14 and the pockets 12 is constructed of a rigid or semi-rigid material. In addition, a cup holder 32 is provided that is operably interconnected to the rigid panel 34 and selectively interconnected to an inner surface of the pocket 12. Hook and loop fasteners or similar selective interconnection mechanisms may be employed in conjunction with the cup holder 32 to allow adjustments to the diameter thereof. More specifically, the user may disconnect the free ends of the cup holder 32 from the pocket wall 12 and reattach the free ends to the pocket wall to provide a larger or smaller diameter containment space depending on the needs of the user. Embodiments of the invention of this type may also include a writing instrument holder 18 and a rear pocket 20 as previously described above.

Referring now to FIGS. 18-21, a device for securing items between two adjacent seats 2 is shown that includes a selectively accessible storage compartment 36. This embodiment of the present invention also includes a rigid panel 34 and securing mechanisms 14 as described above. In addition, the storage compartment 36 is provided that includes a panel that may be selectively opened to provide access into the storage compartment. Here, the selectively opening panel 38 is shown interconnected to a front surface of the storage compartment 36. However, one skilled in the art will appreciate that the opening panel 38 may be interconnected to any surface of the storage compartment, such as the upper surface of the storage compartment 36 or on side compartments or adjacent to the sides thereof. The opening panel 38 may also include a gusset 40 that provides strength and prevents wear and tear associated with continuous openings. Further, the opening panel 38 may include a fastener, such as hook and loop fasteners, to ensure the storage compartment remains closed when not in use. This embodiment of the present invention may also include a plurality of pockets 12 situated on the sides of the storage compartment. One skilled in the art will appreciate that these pockets may be adapted to be selectively openable to gain access to the storage compartment as well.

Referring now to FIGS. 1-21, a method of using the present invention is shown and described herein. To secure the device 2 between two adjacent seats 16 the resiliently deflectable panel 14 is simply deflected and folded upon itself to thus orient the securing mechanisms 14 on either side of the device 2. The securing mechanisms 14 are then inserted between two adjacent seats 16 by slightly deflecting the seats 16. Once the device 2 is in place, the compliant nature of the seats 16 will force them onto the securing mechanisms 14 resulting in structural stability. This balance of forces will secure the device 2 between the two seats 16 wherein it will remain in position during normal vehicle use. Finally, a plurality of items such as sunglasses 22, cell phones 24, make up, etc. are inserted into the pockets 12. It should be noted that the pockets 12 may be constructed of a resiliently deflectable material to more securely hold the items contained therein. For example, the pockets 12 may be partially constructed of an elastic material that will squeeze the contained items.

Figure 22:
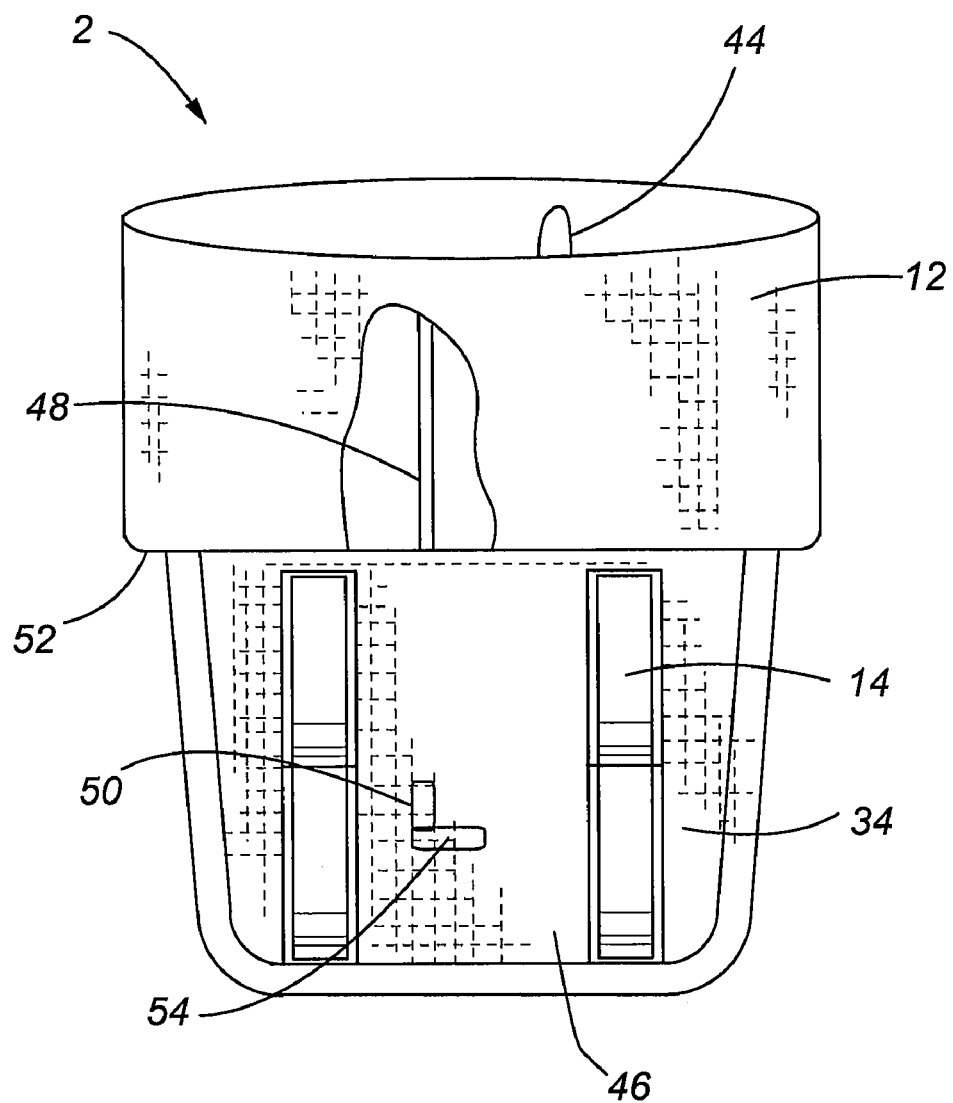
FIG. 22 is a front elevation view of another embodiment of the present invention that includes a hinged panel.
Figure 23:
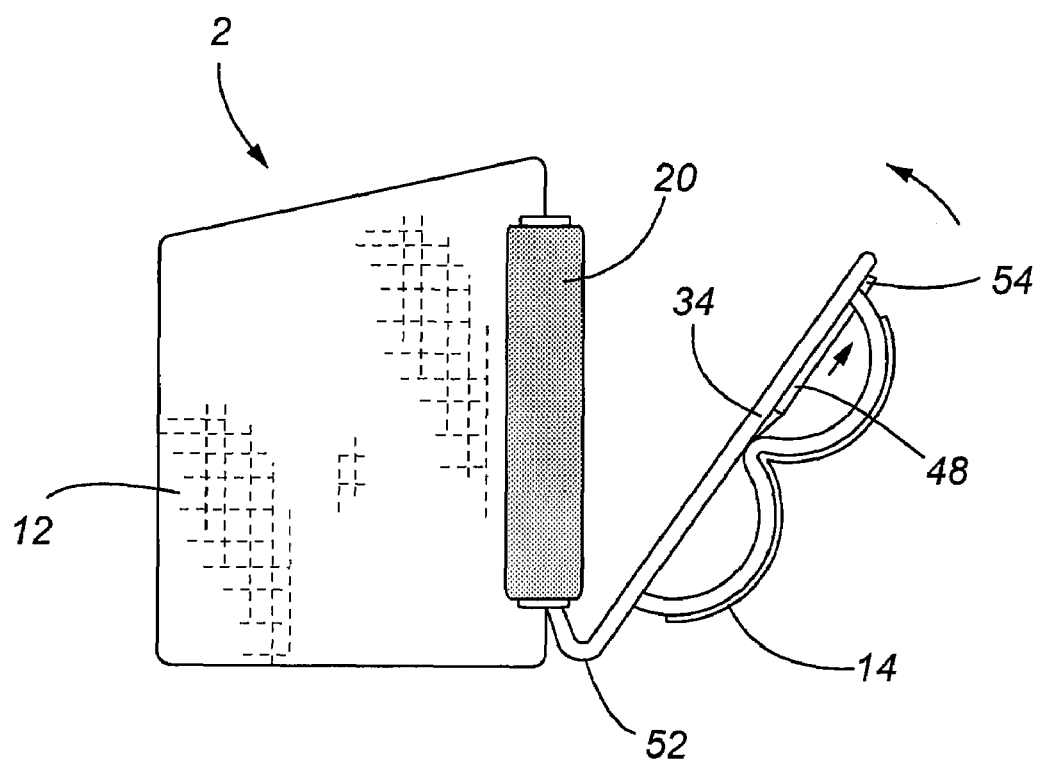
FIG. 23 is a right elevation view of the embodiment of the invention shown in FIG. 22.

Referring now to FIGS. 22 and 23, yet another embodiment of the present invention is shown. More specifically, this embodiment of the present invention includes a pocket 12, that may additionally include a divider 44. In order to reduce packaging and shipping costs, the panel 34 of the storage device may be interconnected to the pocket 12 via a hinge 52, thereby allowing the panel to selectively rotate adjacent to the pocket 12 for storage. In order to create a structure for interconnection between two adjacent car seats, a selectively adjustable retention pin 48 is provided. More specifically, embodiments of the present invention include the retention pin 48 that is slidingly positioned within a sleeve 46 that is integrated into the panel. In order to move the retention pin 48, the user accesses a grip 54 on one end of the retention pin 48 and slides the retention pin 48 upwardly, thereby moving the retention pin 48 into the pocket 12. When the retention pin 48 is positioned in this location, the panel 34 is substantially rigid and is unable to move with respect to the pocket 12. In order to facilitate packaging and shipping, the retention pin 48 is pulled down to remove it from the pocket 12, thereby allowing the panel 34 to rotate around the hinge point relative to the pocket 22. One skilled in the art will appreciate that other securement mechanisms may be used alone, or in conjunction with, the retention pin 48. For example, hook-and-loop fasteners, metal fasteners, plastic fasteners, adhesives, etc. may be employed on the panel 34 and/or the pocket 12 to provide rigidity to the device for storage between vehicle seats. Alternatively, it is contemplated that the panel 34 and the pocket 12 be at least partially severable wherein the panel 34 slidingly engages within the pocket 12. In this configuration a lanyard, which may be elastic, may be provided to ensure the panel 34 and the pocket 12 remain at least partially associated.

The retention pin 48 is constructed out of a rigid material, such as a metal, but may be formed of any other rigid material known in the art. The retention pin 48 is also interconnected to the pocket 12 via an aperture 50 that allows for selective engagement and disengagement of the retention pin 48 into the pocket 12. Again, this embodiment of the present invention is advantageous since it provides a reduced profile and hence less space required for packaging. More specifically, one skilled in the art will appreciate that packaging of products is associated with increased costs. By providing a product that is foldable and yet usable in its preferred orientation, a manufacturer is able to use smaller, less expensive packaging.

Referring now to FIGS. 1-23, a method of constructing one embodiment of the present invention is shown and described herein. One embodiment of the present invention is constructed of resiliently deflectable material that is enveloped by a compliant material, such as nylon, which resists spills and stains and is easily cleaned. The pockets 12 of this embodiment of the present invention are also constructed from a similar material and interconnected onto the resiliently deflectable panel 4. The axis 10 of the resiliently deflectable panel may be constructed by reducing the thickness of the panel core to allow for easier deflection thereof. The pockets may be constructed of a mesh material to allow for viewing of the contents therein. Preferably, in one embodiment of the present invention, the securing mechanisms 14 are constructed of a semi-rigid plastic material that is adapted to selectively deflect to allow for insertion and securement of the device 2 between two adjacent seats 16.

While various embodiments of the present invention have been described in detail, it is apparent that modifications and adaptations of those embodiments will occur to those skilled in the art. However, it is to be expressly understood that such modifications and adaptations are within the scope and spirit of the present invention, as set forth in the following claims.

What is claimed is:

1. A storage device adapted for selective engagement between a seating surface of two adjacent seats, comprising:
   a panel with an upper edge, a lower edge and lateral edges extending therebetween;
   at least one storage compartment interconnected to at least one of a front surface and a rear surface of said panel, said at least one storage compartment adapted to receive and store a plurality of items; and
   a resiliently biased securing mechanism interconnected to at least one of said front surface and a rear surface of said panel and positioned below said at least one storage compartment, said securing mechanism having a plurality of attachment points that are entirely positioned on said panel, wherein no portion of said securing mechanism extends beyond a perimeter edge of said panel; and
   wherein said resiliently biased securing mechanism is compressed between the two adjacent seats to provide stability to said storage device.

2. The storage device of claim 1, wherein said resiliently biased securing mechanism is comprised of at least partially one of a metal, a rubber, an extruded polystyrene, a nylon, and a plastic material, and has a first and second end interconnected to said panel and an interior portion extending between said first and second ends being positioned away from the surface of the panel.

3. The storage device of claim 1, wherein said resiliently biased securing mechanism has an arcuate shape.

4. The storage device of claim 1, wherein said panel is substantially rigid.

5. The storage device of claim 1, further comprising a second storage compartment positioned adjacent to said at least one storage compartment.

6. The storage device of claim 1, further comprising an auxiliary pocket interconnected to at least one of said front surface and said second surface, opposite from said at least one storage compartment.

* * * * *